(12) United States Patent
Amir et al.

(10) Patent No.: US 9,510,146 B1
(45) Date of Patent: *Nov. 29, 2016

(54) SYSTEM AND METHOD OF SUPER SYNCHRONIZATION IN RTLS

(71) Applicant: CenTrak Inc., Newton, PA (US)

(72) Inventors: Israel Amir, Newtown, PA (US); Deepak Gopi, Bensalem, PA (US)

(73) Assignee: CENTRAK, INC., Newtown, PA (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/503,831

(22) Filed: Oct. 1, 2014

Related U.S. Application Data

(63) Continuation of application No. 14/136,193, filed on Dec. 20, 2013, now Pat. No. 9,219,984.

(51) Int. Cl.
*H04W 4/02* (2009.01)
*H04W 56/00* (2009.01)
*H04W 84/12* (2009.01)

(52) U.S. Cl.
CPC ......... *H04W 4/021* (2013.01); *H04W 56/0015* (2013.01); *H04W 84/12* (2013.01)

(58) Field of Classification Search
CPC H04W 4/021; H04W 56/0015; H04W 84/12
USPC ....................................................... 398/115
See application file for complete search history.

(56) References Cited

U.S. PATENT DOCUMENTS

| | | | |
|---|---|---|---|
| 7,391,975 B2 | 6/2008 | Oettinger et al. | |
| 8,139,945 B1* | 3/2012 | Amir .................. | H04B 10/1149 340/8.1 |
| 2007/0236334 A1 | 10/2007 | Borovoy et al. | |
| 2007/0274275 A1* | 11/2007 | Laroia ................. | H04W 40/244 370/338 |
| 2009/0208221 A1 | 8/2009 | Sasai | |
| 2011/0170872 A1* | 7/2011 | Shin .................... | H04B 10/1149 398/78 |
| 2011/0216658 A1* | 9/2011 | Etkin ...................... | H04L 12/26 370/242 |
| 2011/0316676 A1* | 12/2011 | Bajic ..................... | G06K 7/0008 340/10.33 |
| 2014/0111313 A1* | 4/2014 | Wild ................... | G06K 7/10059 340/10.42 |

* cited by examiner

*Primary Examiner* — Dalzid Singh
(74) *Attorney, Agent, or Firm* — Maldjian Law Group LLC

(57) ABSTRACT

A RTL system and method for operating, the system including: a plurality of groups, each group including: a battery-operated wireless timing beacon generator to transmit timing beacons, wherein the timing beacon generator obtains its timing synchronization for the timing beacons wirelessly from a timing server; and one or more battery-operated secondary technology base-stations to receive the timing beacons, and to transmit respective secondary technology transmissions based on the received timing beacons; and a portable tag to be located, the portable tag configured to receive timing beacons and secondary technology transmissions from at least one group.

21 Claims, 7 Drawing Sheets

110

SYSTEM AND METHOD OF SUPER SYNCHRONIZATION IN RTLS

CROSS-REFERENCE TO RELATED APPLICATION

This application is a continuation-in-part of U.S. patent application Ser. No. 14/136,193, filed Dec. 20, 2013, the entire content of which is hereby incorporated by reference.

BACKGROUND

Field of the Invention

Embodiments in accordance with the present invention relate to methods and systems for sensor data reporting with high positional accuracy and low power consumption.

Description of Related Art

Indoor Real-Time Location (RTL) Systems (RTLS) are popular in the healthcare industry for a variety of applications ranging from asset tracking through patient and staff tracking, environmental or patient sensing (e.g., temperature), hygiene compliance, elopement (i.e., a patient leaving a facility without authorization), theft prevention, and so forth.

Conventional RTL systems typically use radio frequency (RF) transmission to determine location. The RF-based methods may be augmented with infrared (IR) transmission as a localization method in order to improve accuracy to support room and sub-room level accuracies. An IR receiver typically is incorporated into a portable device (i.e., a tag) and IR transmitters are incorporated into base stations that are scattered in rooms and corridors within the enclosure. Typically, each the IR base stations transmits an identification (ID) to the portable devices, and the location of the portable devices is determined by their vicinity to a base station.

The basic advantages of synchronization of IR based systems are described in U.S. Pat. No. 8,139,945 ("the '945 Patent"), which is hereby incorporated by reference in its entirety. Timing synchronization information is transmitted using a plurality of stationary IR base stations and a plurality of portable devices. Each IR base station is configured to receive the timing synchronization information and to transmit a corresponding IR location code in a time period based on the received timing synchronization information.

In the '945 Patent, each portable device is configured: 1) to receive the timing synchronization information; 2) to detect the IR location codes from the IR base stations; and 3) to transmit an output signal including a portable device ID representative of the portable device and the detected IR location code. Each portable device is synchronized to detect the IR location code in the time period based on the received timing synchronization information. The '945 Patent enables coexistence of multiple IR transmitters at the same physical space, the construction of virtual walls, as well as facilitating high tag update rate with extremely low power consumption for tags.

However, the '945 Patent assumes that each infrared node will have its own unique infrared ID. The assumption does not apply to a configuration involving distributed IR transmissions. In such a distributed IR emitting system, all IR emitters transmit the same infrared ID at the same time. Conventionally, the only way to achieve transmitting the same infrared ID at the same time has been by use of wired connections among the independent emitters in order to allow the co-emissions of the same infrared ID from all the emitters.

Wired connections pose problems during installation and are more difficult to expand, compared to wireless connections. However, over the air super-synchronization has not been used because sufficient synchronization accuracies with low enough power consumption to support battery operated IR base-stations had not been possible or available because the timing accuracy needs to be much better than the high modulation rates (typically 30-40 kHz) of the IR signals.

Therefore, a need exists to provide a low power method to allow co-emission of the IR signals by multiple physically independent IR emitters, using the same ID from all the emitters.

SUMMARY

Embodiments in accordance with the present disclosure include a wireless infrared-aided location system, including: a portable tag to be located, the portable tag comprising an infrared (IR) receiver; and a plurality of base-stations, at least two of said base-stations including: a processor coupled to a memory; a first clock coupled to the processor, the first clock configured to be selectively activated and deactivated by the processor; a receiver coupled to the processor, the receiver configured to receive a periodic timing synchronization signal; and an infrared transmitter coupled to the processor, the infrared transmitter configured to transmit an IR signal to the portable tag, wherein the IR signal is substantially identical and in-phase with IR signals from other base-stations, wherein the processor is configured to synchronize said base-station to the periodic timing synchronization signal.

Embodiments in accordance with the present disclosure include a method to locate a wireless infrared-aided portable tag, including: operating a low-speed clock by a infrared (IR) base-station; activating a high-speed clock prior to an estimated time of arrival of a periodic timing synchronization signal; receiving the periodic timing synchronization signal; synchronizing the high-speed clock by use of the periodic timing synchronization signal; transmitting, by the IR base-station, an IR signal to the wireless infrared-aided portable tag at a time derived from the high-speed clock and the periodic timing synchronization signal, wherein the IR signal is substantially identical and in-phase with IR signals from other IR base-stations; and deactivating the high-speed clock after transmission of the IR signal.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1A:
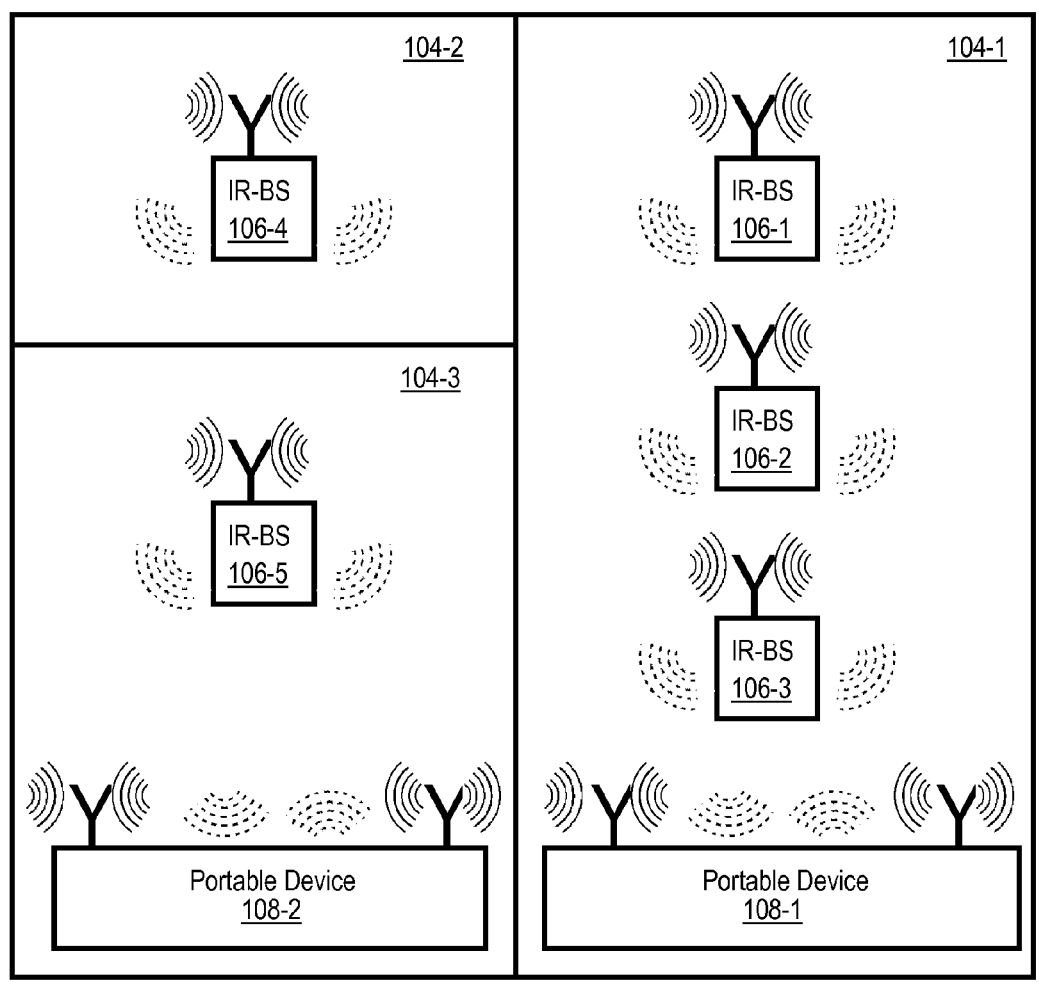
FIG. 1A is a block diagram of a system for locating and identifying portable devices in an enclosure, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers (IEEE) 802.11 family of standards, which are incorporated herein by reference. The IEEE 802.11 standards specify the RF and protocol characteristics of a bi-directional radio communication system.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, infrared, ultrasonic, or optical signal. As used herein, the term "receiver" may generally comprise any device, circuit, or apparatus capable of receiving an electrical, electromagnetic, infrared, ultrasonic, or optical signal. As used herein, the term "transceiver" may generally comprise any device, circuit, or apparatus capable of transmitting and receiving an electrical, electromagnetic, infrared, ultrasonic, or optical signal.

The term "computer-readable medium" as used herein refers to any tangible storage and/or transmission medium that participates in storing and/or providing instructions to a processor for execution. Such a medium may take many forms, including but not limited to, non-volatile media and volatile media. Non-volatile media includes, for example, NVRAM, flash media, or magnetic or optical disks. Volatile media includes dynamic memory, such as main memory. When the computer-readable media is configured as a database, it is to be understood that the database may be any type of database, such as relational, hierarchical, object-oriented, and/or the like.

In embodiments in accordance with the present invention, a tag is customarily an active RFID tag. An active RFID tag uses an internal power source (e.g., a battery) within the tag to continuously power the tag and its RF communication circuitry. In contrast, passive RFID relies on RF energy transferred from a reader to the tag to power the tag. Active RFID allows relatively low-level signals to be received by the tag, and the tag can generate relatively high-level signals back to the access point. Active tags may also initiate communication with an access point or other tags.

RTL systems are known that include base stations that transmit IR signals (i.e., IR base stations) with their respective base station ID (BS-ID) to portable devices that are equipped with IR receivers. Upon reception of a BS-ID, the portable device transmits both the device ID and the received BS-ID to a reception device, for example, by radio frequency (RF) or IR transmission. The RTL system may include a server that associates the BS-ID with the device ID (received from the portable device by the reception device). In this manner, the position of the portable device may be displayed as the position of the IR base station. In exemplary implementations, both base stations and tags are battery operated.

In a distributed IR emitting system, all IR emitters transmit the same infrared ID at the same time. The number of such base-stations may be in some cases, six or more. All IR emitters with the same infrared ID are deemed to be a single location for position-locating purposes. For example, in order to create a virtual corridor between sets of bays, typically three IR emitters are used per bay, and the total number of IR emitters may exceed six. Using the same infrared ID at the same time avoids a problem of a tag mixing up the received signals, and the receiver not being able to decipher the signals. Although the infrared ID may be sent at different times, doing so may have several undesirable consequences. First, the tag response may be slower since a tag may have to wait N times the basic period to receive a signal. Second, embodiments may need to increase the basic rate and the tag will need to check for an IR signal N times more often, causing a corresponding increase in tag power consumption.

Referring now to FIG. 1, a block diagram is shown of a system 100 for determining a location and an identity of portable devices 108 in an enclosure 102. System 100 may include a plurality of IR base stations (IR-BS) 106, one or more portable devices 108 and at least one RF base station (RF-BS) 110. In some embodiments, RF base station 110 may be a Wi-Fi access point (i.e., an RF access point).

RF base station 110 may transmit timing synchronization information (TSI) signal, for example, in a beacon, to IR base stations 106 and portable devices 108 that are each equipped with RF transceivers, by RF transmission. The TSI may be used by IR base stations 106 to transmit a corresponding BS-ID, i.e. an IR location code, in a period of time after receiving the TSI. The period of time for IR base stations 106 to transmit the respective BS-ID signals may be fixed or transmitted as a part of the information carried by the beacon.

Enclosure 102 may include a plurality of separate zones 104, which typically coincide with individual rooms or zones within enclosure 102. For example, zone 104-1 represents a corridor. Each room or zone may be provided with at least one IR base station 106. For example, corridor 104-1 includes IR base stations 106-1, 106-2, 106-3.

IR base station 106 typically transmits very short bursts of IR location signals from an IR transmitter (i.e. corresponding BS-IDs) at periodic intervals based on the TSI received from RF-BS 110. Each IR base station 106 may transmit a BS-ID signal that may be identified at a central control as originating from a particular zone or room 104. The BS-ID may, for example, be transmitted with an IR modulating frequency that is typically around 40 kHz that may be in the form of bursts of the order of about 0.5 milliseconds long. It is understood that any suitable frequency and duration of the IR burst may be used. Although IR base station 106 is described as including an IR transmitter, it is contemplated that IR base station 106 may also include an IR receiver.

Portable devices 108 may be provided for persons or apparatuses. The portable devices 108 may include an IR receiver and an RF transmitter or transceiver (FIG. 4) which are coupled to each other. In this manner, the RF transceiver may receive the TSI and may transmit received BS-ID and its device ID at an RF carrier frequency to RF base station 110.

The modulated carrier signal received by RF base station 110 may be decoded to reproduce the BS-ID and the device ID.

Although IR base stations 106 are described, it is contemplated that the base stations 106 may also be configured to transmit a corresponding BS-ID by an ultrasonic signal, such that base stations 106 may represent ultrasonic base stations. Accordingly, portable devices 108 may be configured to include an ultrasonic receiver to receive the BS-ID from an ultrasonic base station. If an ultrasonic interface is used, then a differential time of arrival method may be used for location detection by the tag.

Figure 1B:
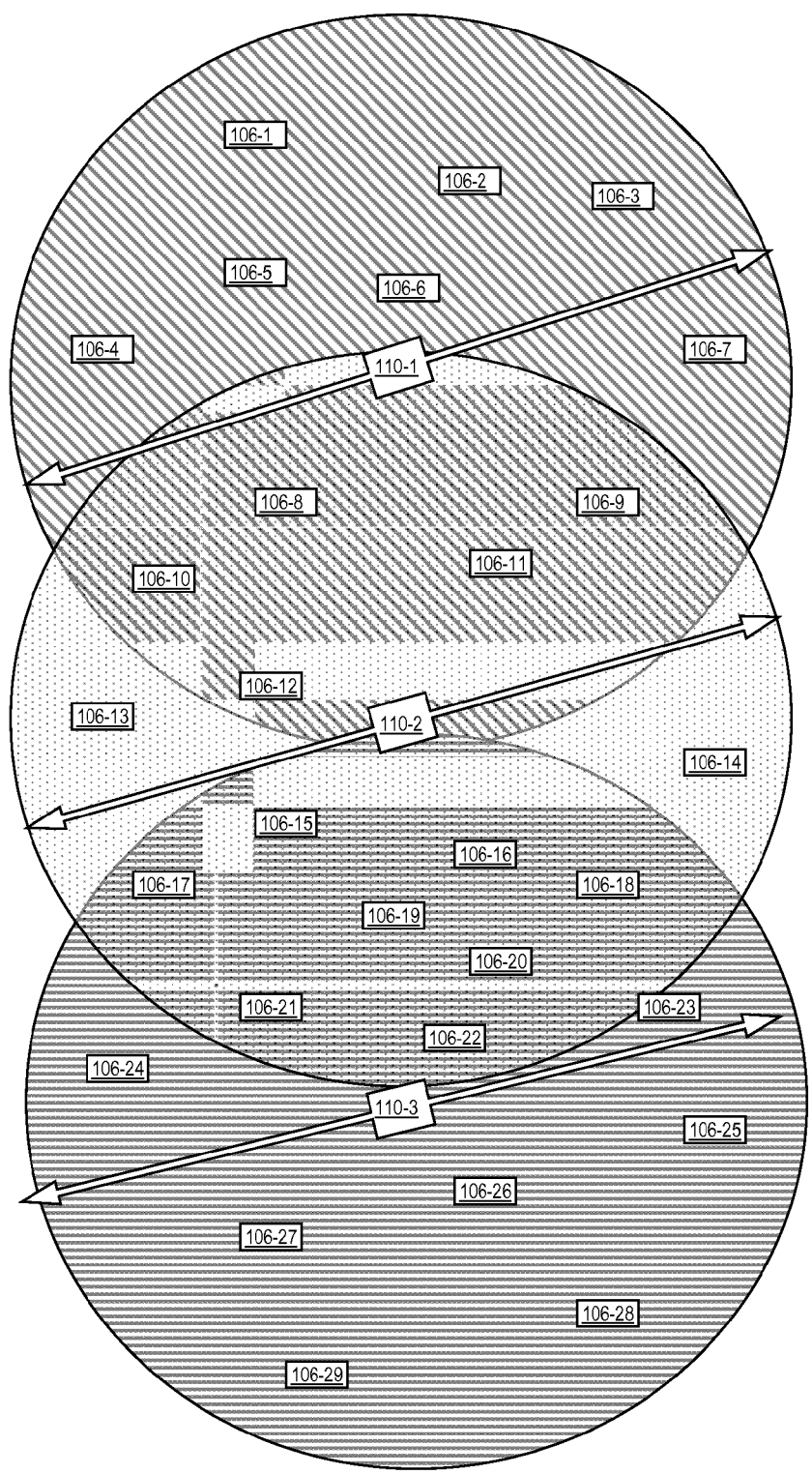
FIG. 1B is a configuration, according to an embodiment of the present invention.

FIG. 1B illustrates a configuration 150 in accordance with an embodiment of the present disclosure. Configuration 150 may represent a deployment in which a plurality of RF base stations 110 provide coverage to a covered area (e.g., large room, corridor, etc.). Configuration 150 may include a plurality of RF base stations 110-1, 110-2 and 110-3, along with a respective coverage region, as denoted by differently-shaded regions. As illustrated, some of the RF coverage regions may spatially overlap. Overlap of RF base station 110 coverage areas helps prevent dead zones within the covered area.

Configuration 150 may further include a plurality of IR base stations, e.g., IR base stations 106-1 through 106-29. Configuration 150 is not limited to the positions or quantities of stations shown. Super-synchronization of each IR base station 106 is controlled by signals that IR base station 106 is able to receive from an RF base station 110. Each IR base station 106-n is able to receive timing synchronization signals from at least one RF base station 110-n. Some IR base stations, e.g., IR base stations 106-1 through 106-7 as illustrated, may be able to receive timing synchronization signals from only one RF base station (e.g., RF base station 110-1). Some IR base stations, e.g., IR base stations 106-8 through 106-12, and 106-15 through 106-22 as illustrated, may be able to receive timing synchronization signals from more than one RF base station 110 (e.g., RF base stations 110-1 and 110-2). In order to avoid RF collisions, RF base stations whose coverage areas may overlap are configured to operate on different frequencies or to transmit at slightly different times.

In order to avoid excessive levels of interference to IR base stations 106-n in overlap regions (e.g., IR base stations 106-8 through 106-12, and 106-15 through 106-22), adjacent RF base stations 110-n may transmit their timing synchronization signals at different times and/or frequencies. For example, RF base station 110-1 may be configured to transmit its timing synchronization signal at a first frequency or within a first timing slot. RF base station 110-2 may be configured to transmit its timing synchronization signal at a second frequency or within a second timing slot. Thus, although an IR base station 106 (e.g., IR base stations 106-8) may receive a first timing synchronization signal from a first source (e.g., from RF base station 110-1) and a second timing synchronization signal from a second source (e.g., from RF base station 110-2), the IR base station may use the received time slot and/or frequency information in order to distinguish between the different timing synchronization signals.

Figure 2:
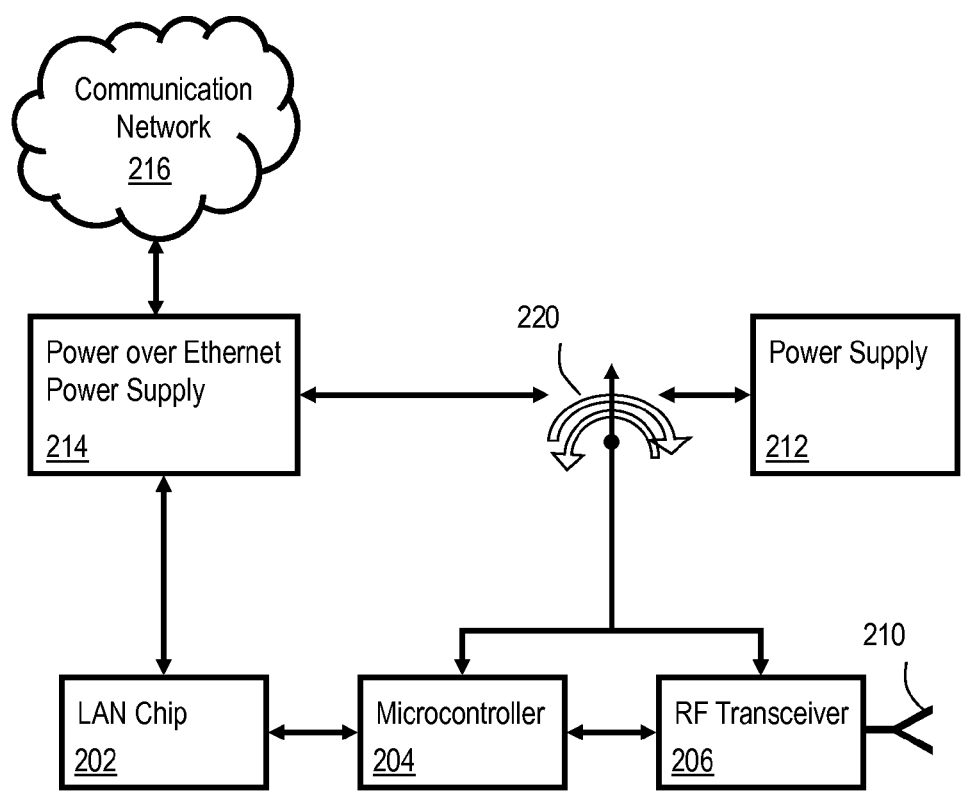
FIG. 2 is a block diagram of a radio frequency (RF) base station, according to an embodiment of the present invention.

FIG. 2 illustrates a block diagram of RF base station 110. RF base station 110 may include local area network (LAN) chip 202, microcontroller 204, RF transceiver 206, and antenna 210 In one embodiment of the current invention, the RF base-stations 110 receive their timing synchronization via Ethernet. In another embodiment, the timing synchronization is transferred from one RF base-station 110 to another.

LAN chip 202 may interface via Ethernet interface 214 to a communication network 216 such as a LAN, WAN, or Internet. Switch 220 maybe used to select a power source for RF base station, e.g., between power supply 212 or power derived from Ethernet interface 214. Power supply 212 may represent a battery or an interface to conventional AC power.

RF transceiver 206 may be configured to receive RF transmissions, for example, from portable device 108 (FIG. 1A) or from another RF base station 110, from antenna 210. RF transceiver 206 may also be configured to transmit the TSI, such as by transmitting an RF beacon that includes the TSI, via antenna 210.

Microcontroller 204 may be configured to control LAN chip 202, and RF transceiver 206, for example, to transmit the TSI, communicate with other RF base stations and receive RF transmissions from portable devices 108 (FIG. 1A).

Figure 3:
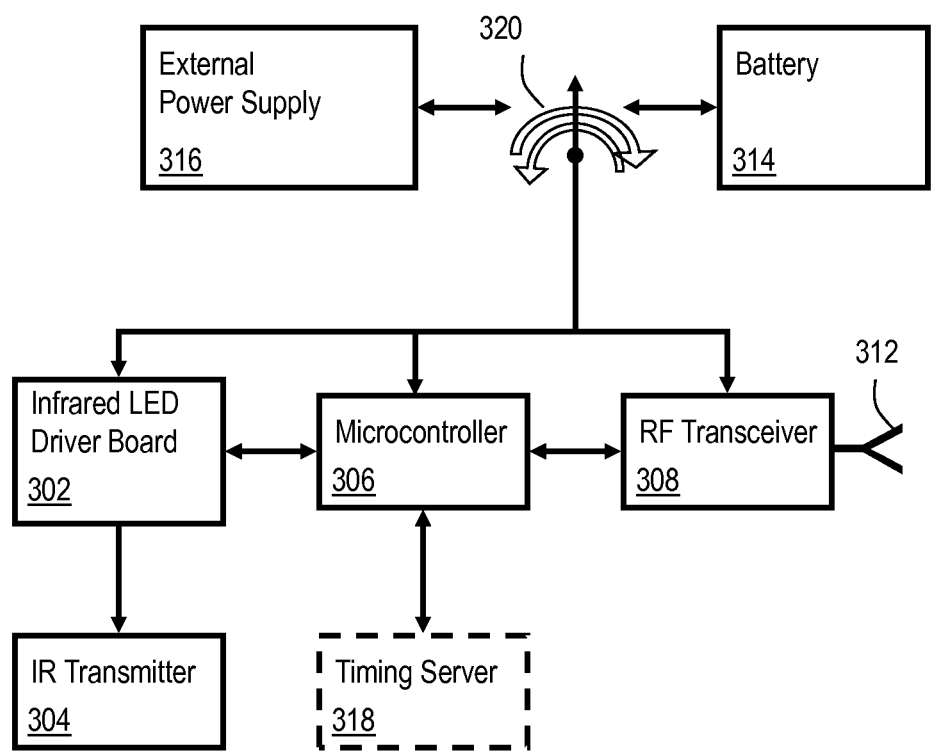
FIG. 3 is a block diagram of an infrared (IR) base station, according to an embodiment of the present invention.

FIG. 3 illustrates a block diagram of IR base station 106. IR base station includes RF receiver or transceiver 308 (henceforth collectively referred to as RF transceiver 308), antenna 312, microcontroller 306, IR LED driver board 302 and IR transmitter 304. IR base station 106 may be powered by battery 314 or by an external power supply 316. Synchronized IR base stations 106 may provide for a simple and low cost installation and allow for a coexistence of IR base stations 106 without dead regions (typically caused by an overlap in coverage). RF transceiver 308 may be configured to receive RF transmissions, for example, beacons including the TSI from RF base station 110 (FIG. 1) via antenna 312. Switch 320 maybe used to select a power source for IR base station 106, e.g., between external power supply 316 or battery 314.

IR base station 106 may further include an interface to a centralized timer 318. Centralized timer 318 may be, e.g., a timing server accessible via a Network Time Protocol (e.g., NPTv4), as described in RFC-5905, incorporated herein by reference.

Although not shown in FIG. 3, a BS-ID associated with IR base station 106 may be stored by IR base station 106, for example, in a memory of microcontroller 306. Driver board 302 may be configured to transmit the associated BS-ID to IR transmitter 304. it is understood that IR transmitter may include any device suitable for transmitting an IR burst that includes the associated BS-ID.

Microcontroller 306 may be configured to control driver board 302, and RF transceiver 308. Based on the TSI received by RF transceiver 308 at time $T_1$ (see FIG. 5), microcontroller 306 may control driver board 302 to transmit the BS-ID at time $T_2$ (see FIG. 5), after the TSI is received. For example, referring to FIG. 5, at time $T_0$ the high speed clock 501 is activated. At time $T_1$ the IR base station 106 receives 503 the TSI 403. At time $T_2$, which is made as close as possible to $T_1$, IR transmitter 304 (see FIG. 3) may be controlled to transmit IR signal 505 including the BS-ID. High speed clock 501 stays on during transmission of IR signal 505. When IR signal 505 transmission ends, the high speed clock 501 stops and the only active clock is a low-speed clock 502 (see FIG. 5).

This process repeats with a period $T_K$, i.e., at $T_K+T_1$ another beacon 503 may again be received by IR base station 106 (FIG. 3). Although IR transmission 505 is illustrated as occurring once every period $T_K$, it is contemplated that an IR base station transmission 505 may be activated multiple times in time period $T_K$.

IR base station 106 may use an optional time adjust module 318 in order to receive relatively high accuracy time estimates in order to correct a relatively lower-accuracy clock that is internal to IR base station 106. Time adjust module may be local to IR base station 106 or may be remote but communicatively coupled to IR base station 106.

Referring back to FIGS. 1A, 1B and 3, by synchronizing all of the nodes (e.g., the RF base station 110 and all IR base stations 106), portable device 108 and/or IR base stations 106 may be powered by battery 314. Because base stations 106 are battery powered, if the nodes of system 100 were not synchronized, the IR transmitter 304 would need to transmit IR signals more often so the tag could quickly be able to "find" the transmissions. IR transmission may be power consuming and high rate transmissions may quickly deplete the battery of base stations 106.

According to an exemplary embodiment, IR base station 106 may include a coarse, low-speed timer and a fine, high-speed timer, for example, as part of microcontroller 306. The timers may be used by microcontroller 306 to begin IR transmission to portable devices 108-$n$ at highly accurate times.

Figure 4:
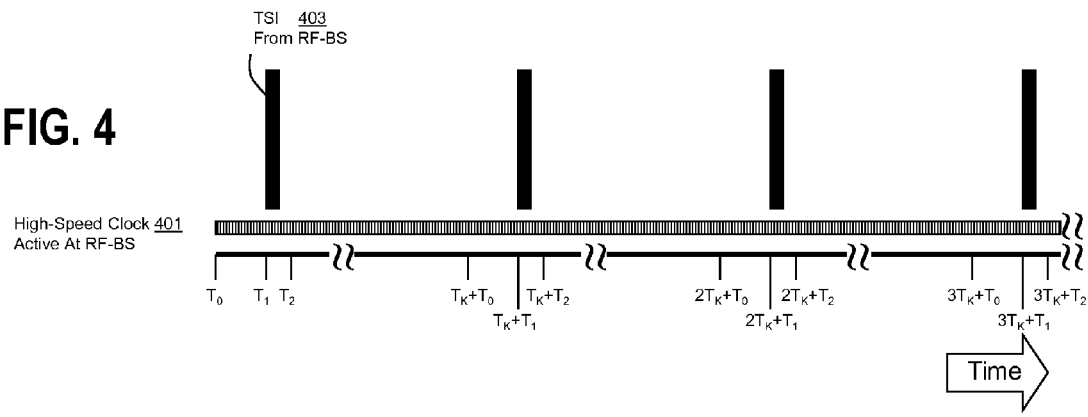
FIG. 4 depicts timing of TSI from an RF base station, in accordance with an embodiment of the present invention.

FIG. 4 illustrates periodic timing of the transmission of TSI 403 from RF base station 110 in accordance with an embodiment of the present disclosure. Depending upon the context of usage, reference item 403 may refer to either the TSI signal, or to the act of sending the TSI signal. RF base station 110 may maintain a high-speed clock 401, which may be continuously powered if RF base station 110 is operated from a wired power source. RF base station 110 transmits a timing synchronization information (TSI) 403 having a period of $T_K$ seconds, and sent at times $T_1$, $T_K+T_1$, $2T_K+T_1$, . . . $nT_K+T_1$, with "n" being a positive integer. Typically, the period $T_K$ is in the range of $1 \le T_K \le 60$ seconds. TSI 403 may be received by both the IR base stations 106 and portable devices 108, and may be used to control timing of an IR signal transmitted by IR base station 106. In some embodiments, IR base stations 106 may synchronize their clocks to TSI 403 as received from RF base station 110.

Figure 5:
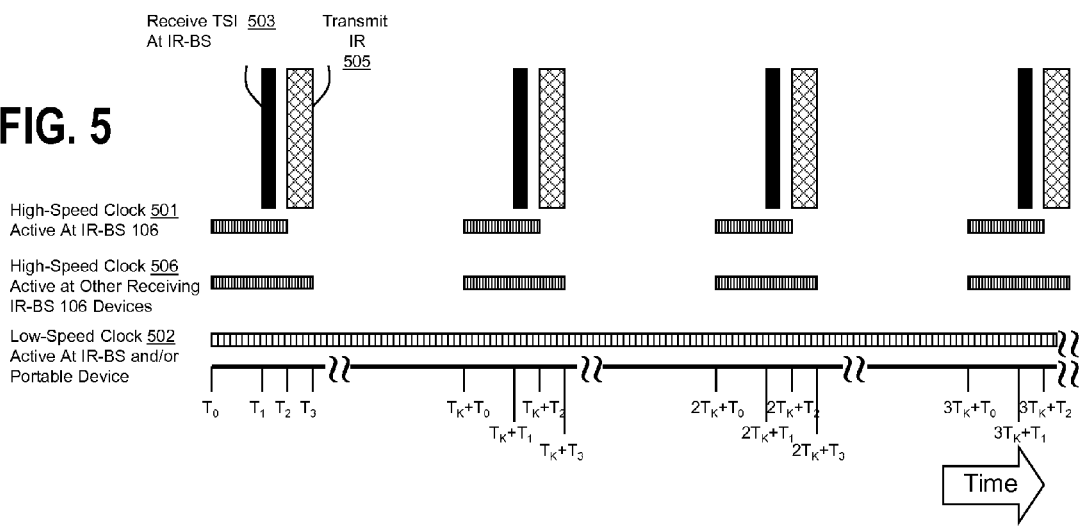
FIG. 5 depicts timing of operations at an IR base station, in accordance with another embodiment of the present invention.

FIG. 5 illustrates timing of operations at an IR base station 106. All of the IR base stations 106 transmit a same IR-ID at a set delay from the time that each IR base station 106 received TSI 403. As illustrated, IR base station 106 receives TSI 403 signals periodically with a period of $T_K$, which is the same period as illustrated in FIG. 4 for RF-BS 110. In particular, FIG. 5 illustrates reception 503 and usage of TSI 403. Depending upon the context of usage, reference item 503 may refer to either the TSI signal received by IR base station 106, or to the act of receiving the TSI signal by IR base station 106. IR base station 106 may run a low-speed clock 502 substantially continuously. For example, low-speed clock 502 may run at about 32 kHz.

In some embodiments, IR base station 106 may further include a high-speed, high-accuracy clock 501. In some embodiments, clock 501 may be an 8 MHz clock with 0.125 uS resolution and about 10 ppm accuracy. Timing accuracy between different IR base stations 106 should not differ by more than about 2 us. At predetermined times based upon low-speed clock 502, IR base station 106 may activate clock 501, clock 501 being activated at times to substantially ensure that clock 501 is active when TSI 403 is expected to be received 503 at IR base station 106. This operation reduces power consumption by not powering clock 501 when it will not be needed.

Usage of periodically-activated high-speed, high-accuracy clock 501 in order to provide greater timing accuracy when needed, than can be provided by low-speed clock 502, is referred to as super synchronization.

TSI 403 may include information that indicates a desired time delay between the receipt 503 of TSI 403 at IR base station 106, and the transmission 505 of an IR beacon transmitted by IR base station 106. Depending upon the context of usage, reference item 505 may refer to either the IR beacon transmitted by IR base station 106, or to the act of sending the IR beacon by IR base station 106. IR base station 106 may use the time delay indicated by TSI 403, together with high-speed clock 501, in order to more accurately control the time at which IR base station 106 transmits its IR beacon 505, e.g., by setting $T_2=T_1+TimeDelay$. Embodiments in accordance with the present disclosure use time-division multiplexing (TDM) and frequency-division multiplexing (FDM) in order to control TimeDelay in order to coexist with other RF stations 110 that control different IR base-stations 106.

As illustrated in FIG. 5, high-speed clock 501 may be activated at times $T_0$, $T_K+T_0$, $2T_K+T_0$, ... $nT_K+T_0$, with $T_0<T_1$ and "n" being a positive integer. IR base station 106 may use high-speed clock 501 to denote the accurate time 503 of the RF base station clock for reception of TSI 403 (i.e., denote the occurrence of times $T_1$, $T_K+T_1$, $2T_K+T_1$, ... $nT_K+T_1$). At receipt 503 of TSI 403, the desired time delay is decoded from TSI or a priori information given to the base-station 403, and the decoded time delay is applied to high-speed clock 501 in order to accurately determine the times at which to transmit the IR beacon 505, i.e., at times $T_2$, $T_K+T_2$, $2T_K+T_2$, ... $nT_K+T_2$. High-speed clock 501 may be deactivated shortly after the end of transmission of IR beacon 505, i.e., shortly after times $T_3$, $T_K+T_3$, $2T_K+T_3$, ... $nT_K+T_3$. By deactivating high-speed clock 501 when it is no longer needed, power consumption by IR base station 106 may be reduced. Typically, high-speed clock 501 needs to be activated for only about 10 ms to about 200 ms within each period of $T_K$ seconds.

In some embodiments, high-speed clock 501 may be activated or corrected based upon time information derived from a request for time from optional time adjust module 318, and an associated response from time adjust module 318. For example, IR base station 106 may transmit a request for time to time adjust module 318. A response would be received and used to correct low-speed clock 502. In this way, IR base station 106 is able to more accurately estimate the time at which high-speed clock 501 should be turned on, e.g., $T_0$, ... $nT_K+T_0$.

Figure 6:
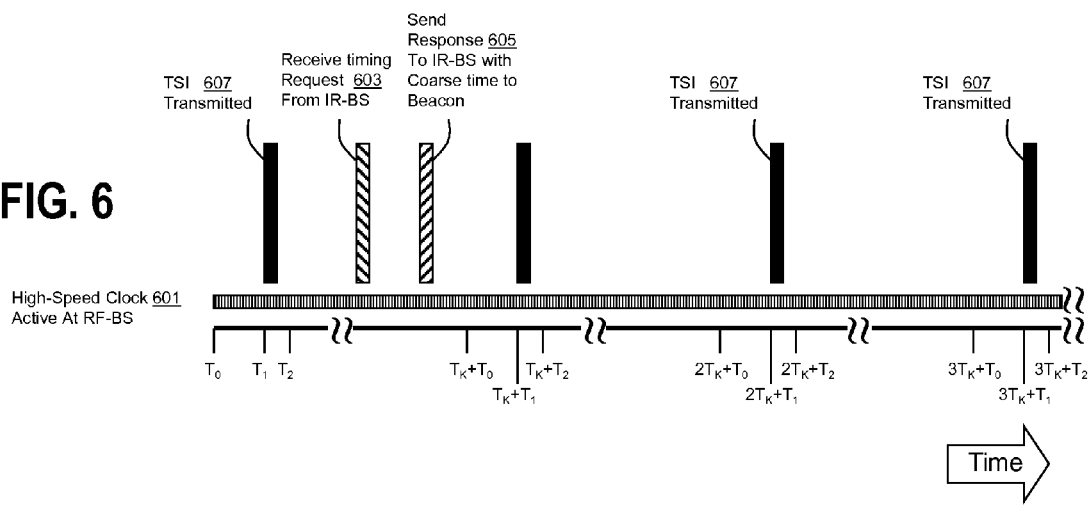
FIG. 6 depicts timing of TSI from an RF base station, in accordance with another embodiment of the present invention.
Figure 7:
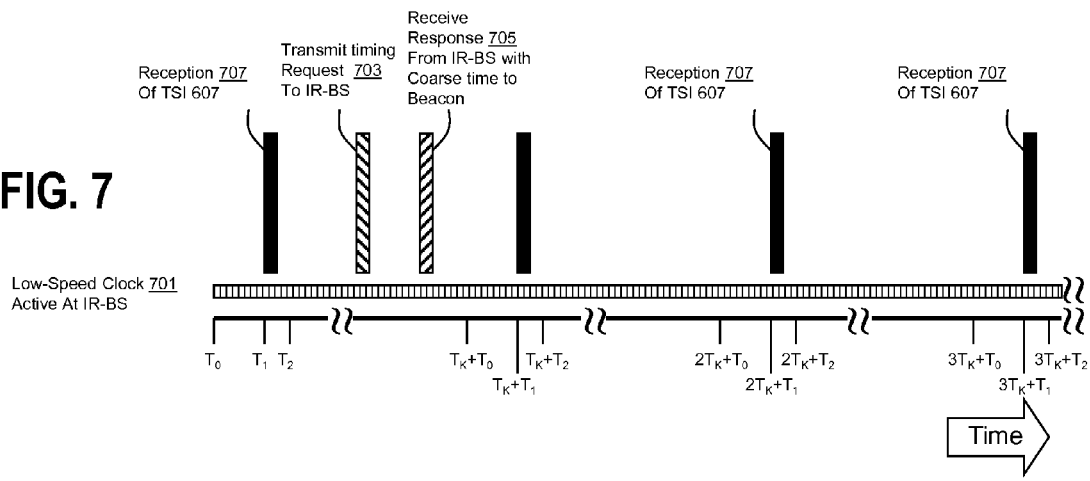
FIG. 7 depicts timing of operations at an IR base station, in accordance with another embodiment of the present invention.

FIGS. 6-7 illustrate another embodiment of a method to provide accurate timing information, in which an IR base station 106 requests timing updates from RF base station 110. FIG. 6 illustrates timing of the periodic transmission of a timing synchronization information (TSI) signal 607 from RF base station 110 in accordance with an embodiment of the present disclosure. RF base station 110 transmits TSI 607 having a period of $T_K$ seconds, and sent at times $T_1$, $T_K+T_1$, $2T_K+T_1$, ... $nT_K+T_1$. Typically, the period $T_K$ is in the range of $1 \leq T_K \leq 60$ seconds. RF base station 110 may operate substantially continuously a high-speed clock 601.

At some times, which may be unplanned or unpredictable by RF base station 110, RF base station 110 may receive from IR-BS 106 a timing request 603 for timing information. The timing request 603 may be a request for a value of a time delay to a next beacon transmission time or the next IR transmission time. RF base station 110 may respond by transmitting a response 605 that provides coarse timing to the next transmission of TSI 607. This is mainly needed in case the IR base-station 106 loses its coarse timing synchronization (e.g., by drifting too far) and does not accurately know when to initiate the high speed clock. This eliminates excessive power consumption especially in periods where the IR base-station 106 is not operational and there are no beacons and the IR base-station 106 needs to search for them.

FIG. 7 illustrates timing of operations at an IR base station 106. An as illustrated, operation of IR base station 106 is periodic with a period of $T_K$, which is the same period $T_K$ as illustrated in FIG. 6 for RF-BS 110. In particular, FIG. 7 illustrates periodic reception 707 of TSI 607.

At some predetermined times, IR base station 106 transmits a timing request 703 to RF base station 110. Reception of, and response to timing request 703 by RF base station 110 is illustrated in FIG. 6. FIG. 7 illustrates reception 705 of the response from RF base station 110 with the coarse timing to the next reception 707 of TSI 607. IR base station 106 may use the timing information within TSI 607 to adjust the coarse clock 701 within IR base station 106.

In some embodiments, rough timing for the time location of the start of the high speed clock 501 is based on a second beacon which is transmitted less often and drives low speed clock 502 until the start time of high accuracy clock 501.

In some embodiments, multiple RF base stations 110 that control a first set of IR base stations 106 may transmit their TSI 403 signals on different frequencies in order to avoid collisions with other RF base-stations 110 that control a different set of IR base-stations 106.

In yet another embodiment in accordance with the present disclosure, multiple RF base stations 110 may transmit their TSI 403 signals in different time slots in order to avoid collisions. IR base station 106 are able to accommodate the different time slots, for example by provisioning time slots during setup of IR base station 106, or through appropriate notification in the TSI 403 signals.

Figure 8:
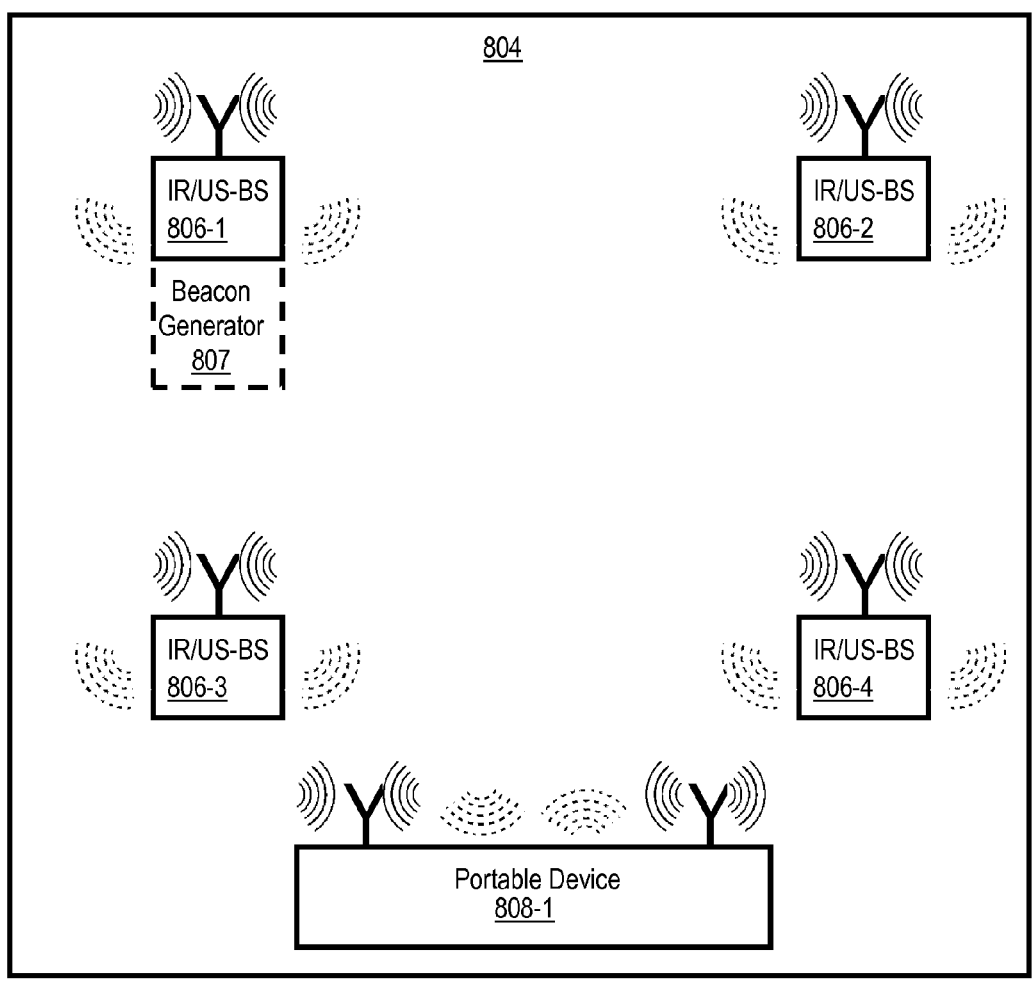
FIG. 8 is a block diagram of a system for locating and identifying portable devices in an enclosure, according to an embodiment of the present invention.

FIG. 8 illustrates another embodiment 800 in accordance with the present disclosure. FIG. 8 illustrates four secondary technology base-stations 806-1, 806-2, 806-3, 806-4. A secondary technology in the context of this application is a non-Wi-Fi communication technology such as infrared and/or ultrasound (IR/US). An individual but unspecified base-station may be referred to as base-station 806-n or base-station 806. All base-stations collectively may be referred to as base-stations 806. Each of base-stations 806-n may employ a non-Wi-Fi secondary technology such as an infrared communication medium, or ultrasound communication medium, or ZigBee (IEEE standard 802.15.4), or 900 MHz, or any combination, in order to communicate with one or more portable devices 808-1. Embodiment 800 further includes an RF base-station 810 that is coupled to a time server 812 by link 811. Link 811 may be either a wired or wireless interface.

RF base-station 810 acts as a Wi-Fi access point (A/P). Base-stations 806 receive coarse timing information from RF base-station 810. In general, although Wi-Fi APs such as RF base-station 810 can broadcast, they do not inherently have an ability to send their transmissions at super accurate (i.e., highly accurate) predefined times. This lack of ability arises from inherent limitations of the Wi-Fi protocol. Wi-Fi is fundamentally asynchronous in nature because it requires a transmitting device to listen before it talks, in order to help avoid collisions with other transmitting devices.

In some embodiments, portable devices 808-1 may receive two types of timing signals. A first, coarse timing signal (e.g., from a primary network) provides coarse timing information. A second, relatively finer timing signal (e.g., from a different primary network or a subnetwork) provides fine timing information that is more accurate than the coarse timing information. The network of the second timing signal may be coupled to the network of the first timing source in order for the network of the second timing signal to provide corrections to the network of the first timing source.

Each RF base station 810 may provide the first timing signal for coarse timing by use of Wi-Fi signals, and base stations 806 may provide the second timing signal by use of secondary technology signals (e.g., IR/US). For example, the coarse timing information can originate from a Wi-Fi network that cannot guarantee a sufficiently accurate estimate of the time of arrival due to inherent protocol limitations. The fine timing information may be provided from a second source or network that can provide local timing signals (e.g., from a dedicated source such as a 900 MHz RF transmitter, a Zigbee transmitter, one or more local transmitters, and so forth.

In some embodiments, one of base-stations 806-n may be designated as a beacon generator station 807 (e.g., base-station 806-1 as illustrated in FIG. 8). The beacon generator station 807 can provide synchronization signaling that is independent of the timing synchronization of RF base-station 810 (i.e., independent of the Wi-Fi network). The beacon generator station 807 provides synchronization signaling by use of highly accurate transmitted beacons. In this embodiment, base-stations 806 will acquire the coarse timing information (e.g., for rough synchronization purposes) directly from the network of RF base-station 810, and then listen in expected time slots for the highly accurate transmitted beacons from the beacon generator station 807. In some embodiments, these beacon transmitters 807 are a part of the base-station 806-1 itself.

In many cases, coarse synchronization is sufficient, thus allowing both the beacon base-station 807 and the IR/Ultrasound base-stations 806 to be designed and built as battery-based devices. It should be noted that the fine synchronization requirements are not relative to a clock in the primary network (i.e., the network of RF base-station 810), but instead are relative to the secondary clock (i.e., the clock of base-stations 806). The primary goal of the fine synchronization is to allow all the base-stations 806 to have a common timing information relative to each other. The coarse timing information is needed by the base-stations 806 to avoid a need for an open receiver (i.e., a receiver that is constantly energized) on the base-stations 806 to receive the beacons from the master base-station. The coarse synchronization limits the time that the slave base-stations 806 need to open their receiver until they lock to the master base-station.

Embodiments in accordance with the present disclosure may provide an RTLS system that includes a plurality of groups, each group including a battery-operated wireless timing beacon generator 807 to transmit timing beacons, wherein the timing beacon generator 807 obtains its timing synchronization for the timing beacons wirelessly from a timing server 812; and one or more battery-operated secondary technology base-stations 806 to receive the timing beacons, and to transmit respective secondary technology transmissions based on the received timing beacons; and a portable tag 808-1 to be located, the portable tag 808-1 configured to receive timing beacons and secondary technology transmissions from at least one group.

In some embodiments, timing accuracy of the timing beacon generator 807 relative to timing server 812 is coarser than timing accuracy between the group members.

In some embodiments, the battery operated secondary technology base-stations 806 may receive coarse timing synchronization wirelessly from the timing server 812, and receive fine group timing from the timing beacon generator 807.

In some embodiments, timing beacon generator 807 is embedded in a secondary technology base-station 806.

In some embodiments, timing of the timing server 812 is derived from an atomic clock, e.g., a standard atomic clock radio providing timing signals via a wireless interface.

In some embodiments, the timing beacon generator 807 obtains its timing synchronization from a WiFi network, and the portable tag 808-1 transmits its location information to a server coupled to the same WiFi network.

In some embodiments, timing beacon generator 807 transmits timing beacons by use of a radio frequency (RF) technology selected from a group consisting of Zigbee, a non-Wi-Fi technology at 900 MHz, a non-Wi-Fi technology at 2.4 GHz and a non-Wi-Fi technology at 5 GHz.

In some embodiments, portable tag 808-1 is configured to synchronize itself to the secondary technology transmissions by obtaining timing from the timing server 812.

In some embodiments, the timing information provided by the time server 812 to each timing beacon generator 807 in the real-time location system is substantially the same. In other embodiments, the timing information provided by the time server to each timing beacon generator 807 in the real-time location system is not substantially the same.

In some embodiments, at least some of the timing beacon generators 807 transmit timing beacons at a different frequency in order to avoid collisions with other timing beacons. In some embodiments, at least some of the timing beacon generator 807 transmit timing beacons at a different time in order to avoid collisions with other timing beacons.

In some embodiments, the portable tag 808-1 is configured to synchronize itself to the secondary technology transmissions by locking the timing of the portable tag 808-1 to the timing of the secondary technology transmissions.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A real-time location (RTL) system comprising:
    a plurality of groups, each group comprising:
        a battery-operated wireless timing beacon generator to transmit timing beacons, wherein the timing beacon generator obtains its timing synchronization for the timing beacons wirelessly from a timing server; and
        one or more battery-operated secondary technology base-stations to receive the timing beacons, and to transmit respective secondary technology transmissions based on the received timing beacons; and
    a portable tag to be located, the portable tag configured to receive timing beacons and secondary technology transmissions from at least one group.

2. The system of claim 1, wherein timing accuracy of the beacon generator relative to the time server is coarser than timing accuracy between group members.

3. The system in claim 2, wherein the battery operated secondary technology base-stations receive coarse timing synchronization wirelessly from the timing server, and receive fine group timing from the beacon generator.

4. The system of claim 1, wherein the timing beacon generator is embedded in a secondary technology base-station.

5. The system of claim 1, wherein timing of the timing server is derived from an atomic clock radio.

6. The system of claim 1, wherein:
    the timing beacon generator obtains its timing synchronization from a WiFi network; and
    the portable tag transmits its location information to a server coupled to the same WiFi network.

7. The system of claim 1, wherein the timing beacon generator transmits timing beacons by use of a radio frequency (RF) technology selected from a group consisting of Zigbee, a non-Wi-Fi technology at 900 MHz, a non-Wi-Fi technology at 2.4 GHz and a non-Wi-Fi technology at 5 GHz.

8. The system of claim 1, wherein the portable tag is configured to synchronize itself to the secondary technology transmissions by obtaining timing from the timing server.

9. The system of claim 1, wherein the timing information provided by the time server to each timing beacon generator in the real-time location system is substantially the same.

10. The system of claim 1, wherein the timing information provided by the time server to each timing beacon generator in the real-time location system is not substantially the same.

11. The system of claim 1, wherein at least some of the timing beacon generators transmit timing beacons at a different frequency in order to avoid collisions with other timing beacons.

12. The system of claim 1, wherein at least some of the timing beacon generators transmit timing beacons at a different time in order to avoid collisions with other timing beacons.

13. The system of claim 1, wherein the portable tag is configured to synchronize itself to the secondary technology transmissions by locking the timing of the portable tag to the timing of the secondary technology transmissions.

14. The method of claim 13, wherein timing accuracy of the beacon generator is coarser than timing accuracy of the secondary technology transmissions.

15. The method of claim 13, wherein the timing beacon generator is embedded in a secondary technology base-station.

16. The method of claim 13, wherein timing of the timing server is derived from a standard atomic clock radio.

17. The method of claim 13, further comprising:
    obtaining, by the timing beacon generator, time synchronization from a WiFi network; and
    transmitting, by the portable tag, its location information to a server coupled to the same WiFi network.

18. The method of claim 13, wherein transmitting timing beacons comprises transmitting timing beacons by use of a radio frequency (RF) technology selected from a group consisting of Zigbee, a non-Wi-Fi technology at 900 MHz, a non-Wi-Fi technology at 2.4 GHz and a non-Wi-Fi technology at 5 GHz.

19. The method of claim 13, further comprising:
    obtaining, by the portable tag, timing from the timing server; and
    synchronizing the portable tag to the secondary technology transmissions by use of the obtained timing.

20. The method of claim 13, further comprising: locking, by the portable tag, the timing of the portable tag to the timing of the secondary technology transmissions, in order to synchronize itself to the secondary technology transmissions.

21. A method to operate a real-time location (RTL) system comprising:
    obtaining, by a wireless timing beacon generator, time synchronization wirelessly from a timing server;
    synchronizing, by the wireless timing beacon generator, timing of the beacon generator to the time synchronization from the timing server, to produce synchronized timing;
    transmitting timing beacons by the wireless timing beacon generator, at the synchronized timing;
    receiving the timing beacons by one or more battery-operated secondary technology base-stations;
    transmitting, by the secondary technology base-stations, respective secondary technology transmissions at times based on the received timing beacons; and
    receiving, by a portable tag, timing beacons and secondary technology transmissions.

* * * * *